US012629869B2

(12) United States Patent
Köffers et al.

(10) Patent No.: US 12,629,869 B2
(45) Date of Patent: May 19, 2026

(54) METHOD FOR MANUFACTURING MOULDED PARTS

(71) Applicant: Siempelkamp Maschinen-und Anlagenbau GmbH, Krefeld (DE)

(72) Inventors: Fabian Köffers, Krefeld (DE); Michael Schöler, Rheurdt (DE)

(73) Assignee: Siempelkamp Maschinen-und Anlagenbau GmbH, Krefeld (DE)

( * ) Notice: Subject to any disclaimer, the term of this patent is extended or adjusted under 35 U.S.C. 154(b) by 247 days.

(21) Appl. No.: 18/278,092

(22) PCT Filed: Feb. 22, 2022

(86) PCT No.: PCT/EP2022/054377
§ 371 (c)(1),
(2) Date: Aug. 21, 2023

(87) PCT Pub. No.: WO2022/175550
PCT Pub. Date: Aug. 25, 2022

(65) Prior Publication Data
US 2024/0316834 A1    Sep. 26, 2024

(30) Foreign Application Priority Data

Feb. 22, 2021    (DE) ..................... 10 2021 000 921.5

(51) Int. Cl.
| | |
|---|---|
| *B29C 43/36* | (2006.01) |
| *B29C 43/10* | (2006.01) |
| *B29C 70/44* | (2006.01) |
| *B29C 43/32* | (2006.01) |
| *B29K 105/08* | (2006.01) |

(52) U.S. Cl.
CPC .......... *B29C 43/3607* (2013.01); *B29C 43/10* (2013.01); *B29C 43/361* (2013.01); *B29C 70/44* (2013.01); *B29C 2043/3238* (2013.01); *B29K 2105/08* (2013.01)

(58) Field of Classification Search
CPC ... B29C 43/3607; B29C 43/10; B29C 43/361; B29C 70/44
See application file for complete search history.

(56) References Cited

U.S. PATENT DOCUMENTS

| | | |
|---|---|---|
| 5,378,134 A | 1/1995 | Blot et al. |
| 10,183,450 B2 | 1/2019 | Henrio et al. |

(Continued)

FOREIGN PATENT DOCUMENTS

| | | |
|---|---|---|
| DE | 102017113595 A1 | 12/2018 |
| EP | 3237358 A1 | 11/2017 |
| JP | S63178028 A | 7/1988 |

(Continued)

OTHER PUBLICATIONS

DE102021000921 claims machine translation (Year: 2021).*

*Primary Examiner* — Alison L Hindenlang
*Assistant Examiner* — Alexander A Wang
(74) *Attorney, Agent, or Firm* — The Webb Law Firm

(57) ABSTRACT

A method for production of molded parts, in particular parts consisting of a fiber composite material, is illustrated and described. In order to reduce the load on the membrane, the membrane according to the invention can be slipped past the seal and the membrane can at least in part be slipped past the seal as a result of the expansion force.

15 Claims, 9 Drawing Sheets

(56) References Cited

U.S. PATENT DOCUMENTS

| | | | |
|---|---|---|---|
| 10,328,604 | B2 | 6/2019 | Podgorski et al. |
| 2020/0361162 | A1 | 11/2020 | Shewchuk et al. |

FOREIGN PATENT DOCUMENTS

| | | | |
|---|---|---|---|
| JP | H2229014 | A | 9/1990 |
| JP | H6182792 | A | 7/1994 |
| JP | 2004535313 | A | 11/2004 |
| JP | 2016539032 | A | 12/2016 |
| JP | 2018508441 | A | 3/2018 |
| JP | 2020189483 | A | 11/2020 |
| WO | 02102565 | A1 | 12/2002 |
| WO | 2015082801 | A1 | 6/2015 |
| WO | 2018167730 | A1 | 9/2018 |

* cited by examiner

METHOD FOR MANUFACTURING MOULDED PARTS

CROSS-REFERENCE TO RELATED APPLICATIONS

This application is the United States national phase of International Application No. PCT/EP2022/054377 filed Feb. 22, 2022, and claims priority to German Patent Application No. 10 2021 000 921.5 filed Feb. 22, 2021, the disclosures of which are hereby incorporated by reference in their entireties.

BACKGROUND OF THE INVENTION

Field of the Invention

The invention relates to a method for manufacturing moulded parts, in particular from fibre composite material, comprising the following steps: a) providing a device comprising: a first pressing tool, a second pressing tool, at least one membrane, and at least one seal, wherein the first pressing tool and the second pressing tool can be moved relative to one another between an open position and a closed position, wherein a working space for a workpiece is formed between the first pressing tool and the second pressing tool, wherein the membrane is arranged at least in sections between the first pressing tool and the second pressing tool, wherein the membrane is arranged at least in sections in the working space, wherein at least one cavity for a working medium is formed between the membrane and the first pressing tool and/or the second pressing tool at least in the closed position, wherein the cavity can be sealed at least in sections by the seal at least in the closed position, wherein, in order to seal the cavity, a sealing force can be applied by means of the seal to the membrane, and wherein the membrane and the first pressing tool and/or the second pressing tool have different thermal expansion coefficients, b) applying a sealing force by means of the seal to the membrane, wherein the cavity is sealed at least in sections by applying the sealing force to the membrane, and wherein a frictional force is applied between the membrane and the seal by the sealing force, c) applying pressure and/or temperature to the membrane, preferably by means of a working medium in the cavity, wherein the membrane expands at least in sections at least in the working space, preferably expanding more strongly than the first pressing tool and/or the second pressing tool, wherein pressure is applied to the membrane, preferably by means of the working medium in the cavity, wherein the pressure counteracts an expansion of the membrane into the cavity and thereby effects an expansion force along the membrane surface, and wherein the expansion force counteracts the frictional force between the membrane and the seal at least adjoining the seal.

Fibre composite materials are composite materials that consist substantially of two main components: reinforcing fibres and a plastic in which the fibres are embedded ("matrix" or "resin"). By combining the two main components, it can be achieved that the composite material as a whole has better properties than the two components alone. For example, due to their high tensile strength in the direction of the fibre, the fibres help to increase the tensile strength of the composite material. The matrix, on the other hand, ensures, for example, that the fibres are held in their position and are protected from mechanical and chemical influences.

One of a plurality of options for the manufacture of components from fibre composite materials is based on the use of prefabricated fibre-resin semi-finished products (so-called "prepregs", abbreviation of "preimpregnated fibres"). In the case of such semi-finished products, the fibres are provided with a resin system that has not yet reacted completely, so that the semi-finished products are still available in a flexible form (e.g. web-shaped, on rollers). The prepregs are only reshaped when the components are manufactured and cured at high pressure and high temperatures by completing the chemical reaction. This step can be done in a press, for example.

For example, prepregs are processed in large quantities in the aviation industry. A challenge in processing is that the aerospace industry often requires very complex part geometries, for example due to reinforcement elements such as stringers. In addition, the assembly work should be reduced, which should be achieved by using fewer, but larger components. The combination of complex geometries and large component dimensions places increased demands on devices and processes for the manufacture of these components. One requirement is, for example, to optimally adapt the membranes used in the devices to the workpiece geometry in order to be able to uniformly apply pressure and/or temperature to the workpiece without overloading the membrane.

Description of Related Art

A device and a method for manufacturing components from fibre composite material are for example known from DE 10 2017 113 595 A1. The component to be manufactured is thereby inserted between two shells. Pressure is thereby to be uniformly applied to the component to be manufactured, whereby a flexible membrane acts on the component such that an oil pressure acts on the membrane on the side of the membrane facing away from the component. The membrane is therefore pressed onto the component surface by an oil pressure. In this manner, it should also be ensured in the case of curved part surfaces that the oil pressure acts on all sides and thus the force acting from the membrane on the part surface is the same at all points, in particular even the force component acting orthogonally on the part surface.

The use of such a "membrane press" for manufacturing parts from fibre composite material is also known from US 2016/0297153 A1.

With these known presses, a flexible membrane is only provided on one side of the component, whereas a rigid tool is provided on the other side of the component. Although this simplifies the design of presses of this type, presses of this type have the disadvantage that it is only possible to adapt the geometry to the workpiece on the side of the flexible membrane, in particular of the workpiece deformed during the pressing process.

Presses are therefore also known in which two membranes are arranged on opposite sides of the workpiece. A press of this type is known, for example, from WO 2018/167730 A1. The press shown there has two pressing elements to which one membrane is attached in each case (cf. FIG. 4, FIG. 5). Both membranes are rigidly connected to one of the pressing elements. Such a fixed mounting of the membrane facilitates the sealing of the cavities delimited by the membranes and is easy to implement by design, but has the disadvantage that the membrane cannot be optimally adapted to the workpiece surface. In addition, thermally-induced expansions of the membrane cannot be compensated due to its rigid clamping. This can lead to uneven pressure distribution and poorer component qualities as well as expose the membranes to high loads, particularly high stresses.

SUMMARY OF THE INVENTION

The object underlying the invention is therefore to design and further develop the method mentioned at the outset and described in more detail above in such manner that the load on the membrane is reduced.

This object is achieved in a method as described herein in that the membrane can be passed by the seal and in that in step c), the membrane is passed by the seal due to the expansion force.

The method according to the invention is a method for manufacturing moulded parts.

The method first comprises step a), comprising providing a device, in particular a press. A press of this type is also known as a "membrane press". The device comprises a first, for example upper, pressing tool, a second, for example lower, pressing tool and at least one membrane.

The first pressing tool and/or the second pressing tool are preferably manufactured from metal, further preferably from steel, in particular from invar. A long service life of the pressing tools can be achieved by using metal, in particular steel. Invar also has a very low thermal expansion coefficient. The use of invar therefore enables the very precise machining or manufacture of workpieces, in particular moulded parts, even at temperatures varying during the pressing process.

The membrane can for example be formed by a thin metal sheet, preferably a thin steel sheet. A membrane of metal sheet, in particular of a steel sheet, has the advantage that, on the one hand, the membrane can transmit high pressures due to the mechanical properties of metal and, on the other hand, it is well suited to heating or cooling the workpiece due to the high thermal conductivity of metal. The membrane is therefore advantageously provided for the application of pressure and/or temperature to a workpiece. The membrane is preferably formed in one piece, but can alternatively also be formed in several pieces. The device can also comprise two or at least two membranes. By using two or at least two membranes, pressure and/or temperature can be transmitted from different sides to a workpiece, in particular to a moulded part, in a simple manner.

The device also comprises at least one seal. The seal can for example be a graphite seal, which preferably has a wire mesh. The seal can thereby be provided on the first pressing tool and/or on the second pressing tool. Furthermore, the seal can extend at least in sections substantially parallel to the membrane, in particular the membrane surface. The seal is preferably designed in two parts or at least two parts.

The first pressing tool and the second pressing tool can be moved relative to one another between an open position and a closed position. This allows the press to be opened and closed. The relative movement between the first pressing tool and the second pressing tool can, preferably between the open position and the closed position, be a substantially linear movement, in particular an upward and downward movement. A linear movement, in particular an upward and downward movement, means it is constructively quick and simple to adjust the pressing tools between the open and closed position. In the closed position, the first pressing tool and the second pressing tool are moved towards one another and preferably come into contact with one another at least in sections. In the open position, the first pressing tool and the second pressing tool are moved apart such that a workpiece can be inserted between the two pressing tools. In addition to the open position and the closed position, the first pressing tool and the second pressing tool can preferably still be moved relative to one another into at least one intermediate position. The at least one intermediate position is thereby arranged in particular between the open position and the closed positions.

A working space for a workpiece is formed between the first pressing tool and the second pressing tool. This working space is advantageously formed at least in the closed position of the first pressing tool and the second pressing tool. The workpiece is in particular a moulded part, preferably made of fibre composite material. In the working space, at least one workpiece can thereby be inserted, preferably between the at least one membrane, the first pressing tool and/or the second pressing tool. In the working space, pressure and/or temperature can advantageously be applied to a workpiece at least in the closed position, in particular by means of the membrane.

At least one cavity for a working medium is formed between the membrane and the first pressing tool and/or the second pressing tool at least in the closed position. The cavity is thereby preferably delimited by the at least one membrane and the first pressing tool and/or the second pressing tool at least in sections. The cavity is intended to accommodate a working medium therein. In other words: The cavity can be filled with a working medium. The membrane and the first pressing tool and/or the second pressing tool are therefore advantageously connected to one another in a gas- and/or liquid-tight manner. The working medium is for example a gas or a liquid. Pressure and/or temperature can also preferably be applied to the working medium. The pressure and/or temperature, which can be applied to the working medium, can be transmitted to a workpiece, in particular by means of the membrane. The membrane is preferably deformable. The cavity is also advantageously movable and/or deformable in the direction of a workpiece, preferably adjoining the membrane, in particular by filling with a working medium and/or applying pressure and/or temperature. Advantageously, the at least one seal is provided at least in sections at one end of the cavity at least in the closed position and/or at least one end of the cavity is delimited by the at least one seal. If preferably two or at least two membranes are provided, a cavity can be provided between the first pressing tool and a first membrane and preferably a second cavity between the second pressing tool and a second membrane.

The cavity can be sealed at least in sections by the seal at least in the closed position and, in order to seal the cavity, a sealing force can be applied to the membrane by means of the seal. The sealing force can thereby, for example, be effected by a pressing force which can be applied to the first pressing tool and/or the second pressing tool and which can be transmitted to the at least one seal. The sealing force can, for example, also be effected alternatively or additionally by means of the weight force of a component of the device.

The membrane and the first pressing tool and/or the second pressing tool also have different thermal expansion coefficients. Preferably, the thermal expansion coefficient of the at least one membrane is greater than the respective thermal expansion coefficient of the first pressing tool and/or the second pressing tool. For the first pressing tool and/or the second pressing tool, it is therefore advantageous to manufacture them from invar, since invar has a low thermal expansion coefficient.

The method also comprises step b): Applying a sealing force by means of the seal to the membrane, wherein the cavity is sealed at least in sections by applying the sealing force to the membrane, and wherein a frictional force is applied between the membrane and the seal by the sealing force. The sealing force presses the seal onto the membrane such that a working medium cannot escape from the cavity at least in sections. The size of the frictional force depends on the size of the sealing force causing it, often, within certain limits, there is an approximately linear relationship (the ratio between frictional force and contact pressure is also referred to as the "friction coefficient"). As the sealing force increases, for example, the frictional force between the membrane and the seal also increases. The frictional force preferably acts along the membrane surface and thus parallel to the surface of the membrane. Preferably, the frictional force acts substantially in the horizontal direction or substantially in the vertical direction. The frictional force also counteracts the movement of the membrane and/or the forces acting along the membrane surface and adjoining the seal. The frictional force therefore preferably counteracts a relative movement between the membrane and the seal. In particular, the frictional force counteracts a movement of the membrane out of the working space and/or a movement of the membrane into the working space.

The frictional force can be static friction or sliding friction, depending on whether there is a relative movement between the seal and the membrane. If the seal and membrane move relative to one another, there is sliding friction. If the seal and membrane do not move relative to one another, there is static friction. If a sufficiently large force is applied against the static friction so that the static friction limit is exceeded, there is a relative movement between the membrane and the seal, so that there is sliding friction between the membrane and the seal.

The method also comprises step c); applying pressure and/or temperature to the membrane, preferably by means of a working medium in the cavity. It can also be provided that pressure and/or temperature are additionally applied to the first pressing tool and/or the second pressing tool, in particular by means of the working medium in the cavity. To apply pressure and/or temperature to the membrane, the first pressing tool and/or the second pressing tool by means of the working medium, pressure and/or temperature is preferably applied to the working medium itself. Alternatively or additionally, pressure and/or temperature can be applied to the membrane, the first pressing tool and/or the second pressing tool by applying pressure and/or temperature to the first pressing tool and/or the second pressing tool. By means of applying pressure and/or temperature to the membrane, the first pressing tool and/or the second pressing tool, pressure and/or temperature can also be applied to a workpiece in the working space. The membrane can preferably contact the workpiece at least in sections and thereby apply pressure and/or temperature to the workpiece.

In the present case, "applying temperature" refers in particular to heating and/or cooling.

Step c) further comprises the membrane expanding at least in sections at least in the working space, preferably expanding more strongly than the first pressing tool and/or the second pressing tool. Due to the expansion of the membrane, the membrane surface is enlarged and/or the membrane is elongated, in particular in the working space. The membrane, the first pressing tool and/or the second pressing tool preferably expand thermally. In addition, the membrane, the first pressing tool and/or the second pressing tool expand in particular due to the application of pressure and/or temperature. To achieve expansion, the application of temperature involves heating in particular. Alternatively or additionally, the membrane, the first pressing tool and/or the second pressing tool can contract due to the application of pressure and/or temperature. In this case, it may also be provided that the membrane contracts more strongly than the first pressing tool and/or the second pressing tool. In order to achieve contraction, the application of temperature involves cooling in particular.

The method can therefore comprise a step c1), wherein step c1) comprises: Applying pressure and/or temperature to the membrane, the first pressing tool and/or the second pressing tool, preferably by means of the working medium in the cavity, wherein the membrane contracts, in particular thermally contracts, at least in sections at least in the working space. In particular, it can be provided that the membrane contracts more strongly than the first pressing tool and/or the second pressing tool. Step c1) can thereby take place before and/or after step c). Cooling of the membrane, the first pressing tool and/or the second pressing tool before and/or after heating the membrane, the first pressing tool and/or the second pressing tool can thus be provided.

Step c) also comprises applying pressure to the membrane, preferably by means of the working medium in the cavity. This application of pressure to the membrane can in particular be the application of pressure and/or temperature already explained, preferably by means of a working medium in the cavity. However, pressure can also be applied to the membrane alternatively or additionally by other means.

Step c) further comprises that the pressure counteracts an expansion of the membrane into the cavity and thereby effects an expansion force along the membrane surface. The pressure is the pressure applied to the membrane. Due to the expansion of the membrane, the membrane surface is enlarged and/or the membrane is elongated, in particular the section of the membrane which is arranged in the working space. Expansion, in particular bulging, of the membrane into the cavity would result in the membrane no longer substantially continuously bearing against the workpiece to be machined or manufactured and thus pressure and/or temperature not being able to be applied uniformly to the workpiece. In addition, bulging or unfolding of the membrane can result in high loads and thus damage to the membrane. To prevent this, sufficient pressure must counteract the expansion, in particular the bulging, of the membrane into the cavity. The pressure applied to the membrane is therefore advantageously at least the same size, preferably greater than the pressure acting on the membrane in the direction of the cavity, in particular due to the expansion of the membrane.

In the present case, "along the membrane surface" is preferably understood to mean in the direction of the membrane surface. The membrane surface is also preferably the membrane surface which adjoins the workpiece to be machined or manufactured at least in the closed position.

Expansion, in particular bulging, of the membrane into the cavity is in this case in particular understood to mean an expansion of the membrane in the direction of the adjoining cavity, in particular in the direction of the region of the cavity which adjoins the expanding region of the membrane. For example, if the membrane is aligned horizontally, expansion into the cavity is expansion with at least one vertical component in the direction of the adjoining cavity.

The pressure applied to the membrane, which counteracts expansion of the membrane into the cavity, also effects an expansion force along the membrane surface. The expansion force thereby preferably acts at least in sections, in particular adjoining the seal, along the membrane surface in the direction of the seal or away from the seal.

The expansion force is preferably effected by the pressure applied to the membrane being dissipated at least partially along the membrane surface. By applying pressure to the membrane, the membrane is also pressed against the workpiece to be machined or manufactured at least in sections. As a result, the membrane is clamped at least in sections between the workpiece to be machined or manufactured and the pressure applied to the membrane. Due to this clamping, the membrane can expand at least in sections, preferably substantially, only substantially transverse to the clamping and thus along the membrane surface. This can also effect or at least influence the expansion force along the membrane surface.

Step c) further comprises that the expansion force counteracts the frictional force between the membrane and the seal at least adjoining the seal. When the membrane expands, the expansion force acts adjoining the seal along the membrane surface out of the working space. In this case, the frictional force counteracts a movement of the membrane out of the working space and/or the frictional force acts along the membrane surface in the direction of the working space. When the membrane contracts, the frictional force counteracts a movement of the membrane into the working space and/or the frictional force acts along the membrane surface away from the working space. The expansion force also preferably counteracts the frictional force between the membrane and the seal in the contact region of the seal and the membrane.

During step c), the membrane is in abutment with the workpiece to be machined or manufactured at least in sections, in particular due to the application of pressure and/or temperature.

According to the invention, it is provided that the membrane can be passed by the seal and that in step c), the membrane is passed by the seal at least in sections due to the expansion force. By being able to pass the membrane by the seal, a uniform contact of the membrane on the workpiece to be machined or manufactured can be ensured without thereby overloading the membrane. In the event of an expansion of the membrane, the surface or the section of the membrane by which the membrane surface has enlarged and/or by which the membrane has elongated can be guided out of the working space. Folds or bulges in the membrane, which could lead to stresses on the membrane, are thus avoided. As a result, the membrane can bear substantially continuously against the workpiece to be machined or manufactured. In the event of a contraction of the membrane, the ability of the membrane to pass by the seal in turn enables a surface or a section of the membrane to be followed into the working space, in particular in the extent to which the membrane surface has reduced and/or the membrane has shortened. The membrane can thus bear substantially continuously against the workpiece to be machined or manufactured without being exposed to excessive loads, in particular tensile stresses.

By passing the membrane at least in sections by the seal due to the expansion force, the load on the membrane can also be reduced. For the passage of the membrane by the seal, in particular in the case of an expansion of the membrane, pretensioning of the membrane can be dispensed with due to the expansion force or at least the pretension applied to the membrane can be reduced. However, the expansion force alone does not have to cause the membrane to pass by the seal. For the passage of the membrane by the seal, it is therefore preferable that the sum of the forces acting along the membrane surface of the membrane, which counteract the frictional force between the membrane and the seal and act adjoining the seal, is greater than the frictional force between the membrane and the seal. The sum of the forces acting along the membrane surface of the membrane, which counteract the frictional force between the membrane and the seal and act adjoining the seal, thereby comprises at least the expansion force adjoining the seal. Preferably, the expansion force adjoining the seal is also the greatest force acting along the membrane surface, which counteracts the frictional force between the membrane and acts adjoining the seal. By passing the membrane by the seal, the membrane is preferably tensioned and/or the membrane bears substantially continuously against the workpiece to be machined or manufactured.

In this case, the amount of the respective force and/or the respective forces is always assumed in connection with a force and/or forces.

The membrane can also be movable relative to the first pressing tool and/or the relative to the second pressing tool, in particular due to the expansion force relative to the first pressing tool and/or relative to the second pressing tool. There may also be friction between the membrane and the first pressing tool, the second pressing tool and/or another part of the device. However, since the frictional force between the membrane and the seal is usually the greatest frictional force applied to the membrane and counteracts the passage of the membrane by the seal, the frictional force between the membrane and the seal is essential for passing the membrane by the seal.

According to a first configuration of the method, it is provided that step b) and step c) overlap at least in time. This ensures that the cavity is sufficiently sealed by the sealing force and at the same time the membrane can be passed by the seal. Step b) can in particular begin before step c) and/or only end after step c). This means that a leakage of working medium from the cavity can be particularly reliably avoided.

A further embodiment of the method envisages that the expansion force is greater than the frictional force between the membrane and the seal. This ensures that the membrane reliably passes by the seal. In addition, pretensioning of the membrane can be omitted or at least reduced. The expansion force is in particular the expansion force adjoining the seal, which counteracts the frictional force between the membrane and the seal. The expansion force is thereby preferably at least in sections during step b) and/or at least in sections during step c), in particular continuously during step b) and/or continuously during step c), greater than the frictional force between the membrane and the seal. This ensures that the membrane reliably passes by the seal.

One configuration is characterised in that the method comprises the following steps, which take place after step a) and preferably before step b) and/or before step c): a1) providing at least one workpiece, a2) inserting the workpiece into the device, in particular into the working space, and a3) moving the first pressing tool and/or the second pressing tool into the closed position. The at least one workpiece can have a matrix and fibres inserted into the matrix. The fibres inserted in the matrix can for example be carbon fibres, glass fibres, aramid fibres or the like. The fibres can be used, for example, as semi-finished products in the form of mats, nonwoven fabrics, woven fabrics, plaited fabrics or knitted fabrics. The matrix or resin can for example be formed from thermoplastic plastic. The workpiece can be already finished "fibre matrix semi-finished products", which are also referred to as "prepregs". To move the first pressing tool and/or the second pressing tool into the closed position, the pressing tools are moved towards each other, preferably along a pressing axis. Moving the first pressing tool and/or the second pressing tool into the closed position can in particular be a substantially linear movement. Preferably, step a1) takes place before step a2) and before step a3). Step a2) preferably also takes place after step a1) and before step a3). It can also be provided that step b) takes place before steps a1), a2) and a3), in particular step b) can take place at least before step a3). As a result, the cavity can already be sealed and filled with working medium before the first pressing tool and the second pressing tool are moved into the closed position.

According to a further configuration of the method, it is provided that the device provided in step a) comprises at least one device for changing the pretension of the membrane. The device for pretensioning the membrane can for example be implemented by a spring with adjustable spring travel or adjustable pretension. Alternatively or additionally, the pretension can be implemented hydraulically and/or pneumatically by the device for pretensioning the membrane. A device of this type can be used to set and also change a pretension of the membrane, for example in order to adapt the pretension to the workpiece to be manufactured or machined. The setting of a pretension and its changeability make it possible for the membrane to already have a pretension before pressure and/or temperature are applied to the workpiece, in particular before pressure and/or temperature are applied to the working medium located in the cavity. Similarly, the device for changing the pretension of the membrane can contribute to passage of the membrane by the seal, in particular during step c), preferably by applying a pretension force to the membrane.

According to one embodiment, it is provided that the method comprises the following step, which takes place after step a) and, preferably, before step b) and/or before step c): a4) Pretensioning the membrane by means of the device for changing the pretension. The pretension ensures that the membrane already has a smooth surface at the beginning of the action on the workpiece and is not put under tension only by the working medium located in the cavity and is thus "smoothly pulled". This has the advantage that a uniform action of the membrane on the workpiece takes place already at the beginning of the temperature and/or pressure action and the membrane bears preferably substantially continuously against the membrane. By step a4) preferably taking place before step b) and/or before step c), the membrane can already have a pretension before pressure and/or temperature is applied to the membrane, in particular before pressure and/or temperature is already applied to the working medium located in the cavity. Step a4) can take place after steps a1), a2) and a3) or alternatively at least before step a3), in particular before steps a1), a2) and a3). It is also advantageously provided that the steps a4) and step b) and/or step c) overlap at least in time. Step a4) can also take place simultaneously with at least step b) and/or at least step c). Step a4) can in particular begin before step b) and/or before step c) and can only end after step b) and/or only after step c). This ensures that there is sufficient pretension on the membrane, in particular while the membrane is passed by the seal.

A further embodiment of the method is characterised in that a pretension force is applied to the membrane by pretensioning the membrane according to step a4) and, preferably, in that the pretension force, in particular during step b) and/or during step c), is smaller than the frictional force between the membrane and the seal. The pretension force acts along the membrane surface and preferably acts against the frictional force between the at least one membrane and the at least one seal, in particular if the frictional force counteracts a movement of the at least one membrane out of the working space. The pretension force applied to the membrane by pretensioning according to step a4) is preferably also applied to the membrane at least during step b) and/or at least during step c). The pretension force can thus contribute to the passage of the membrane by the seal, in particular in step c) such that even a small expansion force is sufficient to pass the membrane by the seal. By the pretension force, which in particular counteracts the frictional force between the membrane and the seal, being smaller than the frictional force between the membrane and the seal, the load on the membrane can be reduced and thus the service life of the membrane increased. In particular during step b) and/or during step c), it is advisable that the pretension force, which in particular counteracts the frictional force between the membrane and the seal, is smaller than the frictional force between the membrane and the seal, since in these steps the membrane is already highly loaded due to the application of pressure and/or temperature. During step c), in particular in addition to this, the membrane already bears substantially continuously against the workpiece to be manufactured or machined due to the application of pressure. The pretension force may also be smaller before and/or after step b) and/or step c) than the frictional force between the membrane and the seal.

According to an embodiment of the method, it is provided that during step b) and/or during step c), the pretension force applied to the membrane is changed, in particular reduced, by the device for changing the pretension. As a result, the load on the membrane can be kept as low as possible during the method, since high forces act on the membrane in particular during step b) and/or during step c). The pretension force can thereby be changed depending on the sealing force. Preferably, the pretension force is reduced when the sealing force is reduced and/or the pretension force is increased when the sealing force is increased. Alternatively or additionally, the pretension force can be changed depending on the application of pressure and/or temperature to the membrane. Preferably, the pretension force is reduced when the pressure and/or temperature is reduced and/or the pretension force is increased when the pressure and/or temperature is increased. The pretension force can also be changed, preferably increased and/or reduced, before and/or after step b) and/or step c).

A further configuration of the method is characterised in that the sum of expansion force and pretension force, in particular during step b) and/or during step c), is greater than the frictional force between the membrane and the seal. This allows the membrane to pass by the seal counter to the frictional force. This is preferably the expansion force adjoining the at least one seal as well as the pretension force which acts along the membrane in the direction of this expansion force. However, the expansion force alone does not have to cause the passage and can therefore be smaller. It can therefore be advantageously provided that the expansion force adjoining the seal is smaller than the frictional force between the membrane and the seal, which preferably counteracts the expansion force. Advantageously, in this case, the pretension force is also smaller than the frictional force between the membrane and the seal.

A further embodiment of the method provides that the pressure and/or temperature of the working medium in the cavity is changed during step b) and/or during step c). By being able to change the pressure and/or temperature of the working medium in the cavity, the pressure acting on the membrane and/or workpiece and/or the temperature acting on the membrane and/or workpiece can also be changed. Since both pressure and temperature can be changed, it is possible to provide varying pressure and temperature profiles instead of a constant pressure and a constant temperature. For example, an increase in pressure and/or temperature can first be provided, then a constant pressure and/or temperature can be maintained and finally a reduction in pressure and/or temperature can be provided. A change in the pressure of the working medium is made possible, for example by a change in the quantity of the working medium located in the cavity through inflow or outflow of working medium. A change in the temperature of the working medium, on the other hand, can be achieved, for example, by the working medium circulating and the inflowing working medium having a higher or lower temperature than the working medium located in the cavity and thus heating or cooling the working medium located in the cavity.

According to a further embodiment of the method, it is provided that the device provided in step a) comprises at least one device for changing the sealing force, preferably adjoining the seal. The frictional force acting on the membrane can also be changed by the device for changing the sealing force. The changeability of the sealing force can for example be achieved by an actuator acting on the seal, which presses the seal more or less strongly onto the membrane surface. If two or more seals are provided, a device for changing the sealing force is preferably provided on each seal such that the sealing force on each seal can be set and changed independently of the other seals. By changing the sealing force during the application of pressure and/or temperature to the membrane, the working medium and/or the workpiece, it is possible to adapt the effectiveness of the seal to the requirements changing during the method. The needs-based adaptation of the effectiveness of the seal is therefore particularly advantageous, since the two objectives of a particularly good seal (high sealing force) and particularly good mobility of the membrane, in particular good ability of the membrane to pass by the seal (low sealing force), cannot be achieved simultaneously and to the maximum extent; there is a conflict of objectives in this respect. One way of resolving such a conflict of objectives is to establish a ranking between the competing objectives; for example, a good seal is defined as the main objective, while good mobility of the membrane is only defined as a secondary objective. By being able to change the sealing force during the method, it is possible to change the ranking between the competing objectives during the method. For example, at the beginning of the method (e.g. in the heating phase at rising temperatures), the mobility of the membrane can be defined as the main objective because in particular heat-induced expansions of the membrane are to be made possible in this phase. This is achieved by setting a low sealing force and thus a low frictional force between the membrane and the seal. In the further course of the method (e.g. at constant high temperatures and high pressures), on the other hand, the good sealing of the membrane can be defined as the main objective because there is a high risk of leakage in this phase, while in particular heat-induced expansions of the membrane as a result of the approximately constant temperatures hardly occur anymore. This can be achieved by setting a higher sealing force and thus a higher frictional force between the membrane and the seal. The adjustability or changeability of the sealing force therefore enables a situation-based and needs-based prioritisation of competing objectives.

One configuration of the method is characterised in that the device provided in step a) comprises at least one second membrane, wherein at least one second cavity for a working medium is formed between the at least second membrane and the first pressing tool and/or the second pressing tool at least in the closed position, wherein, in order to seal the second cavity, a sealing force can be applied by means of at least one second seal to the second membrane, and wherein the second membrane can be passed by the second seal. The use of a second membrane allows multi-sided action on the workpiece even without deflection of the membrane. When two separate membranes are used, the workpiece can therefore be individually acted upon, for example to react to local deformations of the workpiece. The at least one membrane can preferably be connected to the first pressing tool and the at least second membrane can be connected to the second pressing tool. The at least one membrane and the at least second membrane can have an identical thickness or different thicknesses. Substantially the same pressure and/or substantially the same temperature and/or different pressure and/or different temperature can also be applied in each case to the at least one membrane, the at least second membrane, the at least one cavity and/or the at least second cavity, in particular during step b) and/or during step c). Preferably, it is also provided that in step b), a frictional force is applied between the at least second membrane and the at least second seal by applying a sealing force to the at least second membrane. Advantageously, it is also provided in step c) that pressure and/or temperature are applied to the at least second membrane, preferably by means of a working medium in the at least second cavity, wherein the at least second membrane expands at least in sections at least in the working space, preferably expands more strongly than the first pressing tool and/or the second pressing tool, wherein pressure is applied to the at least second membrane, preferably by means of the working medium in the at least second cavity, wherein the pressure counteracts an expansion of the at least second membrane into the at least second cavity and thus effects a second expansion force along the membrane surface of the at least second membrane. The second expansion force counteracts, at least adjoining the at least second seal, the frictional force between the at least second membrane and the at least second seal. Preferably, in step c), the at least second membrane is also passed by the at least second seal at least in sections due to the second expansion force.

According to one embodiment of the method, it is provided that in step b) and/or in step c), the pressure of the working medium located in the cavity is raised at least to 1.2 bar, in particular to 2 bar, and preferably that in step b) and/or in step c), the pressure of the working medium located in the cavity is raised up to a maximum pressure in the range of between 10 bar and 50 bar, in particular of between 15 bar and 30 bar. By raising the pressure to at least 1.2 bar, in particular to 2 bar, it is ensured in particular that a sufficiently large expansion force is applied along the membrane surface. However, these initially raised values depend heavily on the size of the working space of the press, as well as on the thickness of the membrane, and can also be significantly higher in some cases, for example at least 2.5 bar, 4 bar, 5 bar or even 8 bar. The following rule of thumb applies: 1.0 bar to 2.0 bar per commenced millimetre of membrane thickness. These values are then used to increase or regulate to the described working pressure. In some cases, the maximum pressure in step c) can then be increased to a maximum of 70 bar instead of to a maximum of 50 bar.

Alternatively or additionally, it can be provided that in step b) and/or in step c), the temperature of the working medium located in the cavity is raised to a maximum temperature in the range of between 280° C. and 500° C., in particular of between 310° C. and 410° C. Preferably, in the case of there being at least two cavities, the pressure and/or the temperature of both cavities is raised accordingly. The above-mentioned pressures and the above-mentioned temperatures have led to optimal results in the manufacture of moulded parts from fibre composite material. The stated values are maximum values; during manufacture in the press, lower pressure and temperature values are also reached, for example during the warm-up phase and during the cool-down phase.

Finally, a further embodiment of the method is characterised in that the method comprises the following step, which takes place after step b) and/or after step c): c) opening the device and removing the workpiece. To open the device, the first pressing tool and/or the second pressing tool is moved relative to one another into the open position. In the open position, there is sufficient space between the pressing tools to be able to remove the workpiece easily and quickly.

BRIEF DESCRIPTION OF THE DRAWINGS

The invention will be explained in greater detail below on the basis of a drawing merely depicting preferred exemplary embodiments, in which is shown.

DESCRIPTION OF THE INVENTION

Figure 1A:
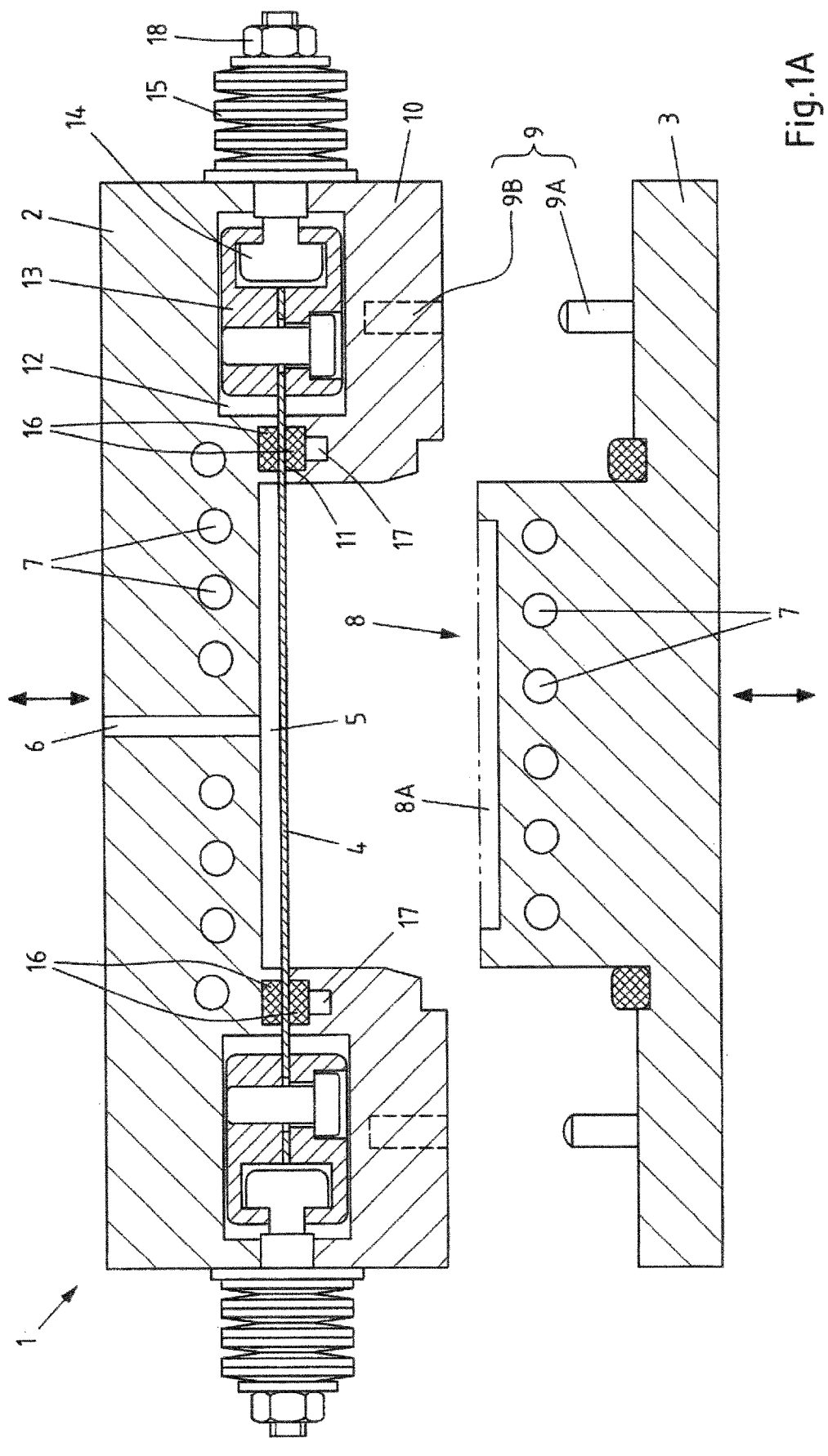
FIG. 1A: a first configuration of a device for carrying out a method according to the invention in cross-section in an open position without an inserted workpiece.

FIG. 1A shows a first configuration of a device 1 for carrying out a method according to the invention in cross-section in an open position without an inserted workpiece. The device 1 comprises a first, upper pressing tool 2 and a second, lower pressing tool 3. The two pressing tools 2, 3 can be moved relative to one another, for example in the vertical direction (indicated by arrows in FIG. 1A). The two pressing tools 2, 3 can thereby be moved relative to one another between an open position and a closed position. In addition, the press comprises a membrane 4, which is arranged at least in sections between the first pressing tool 2 and the second pressing tool 3. In the present case, the membrane 4 is connected to the first pressing tool 2. As an alternative to the configuration shown in FIG. 1, the membrane 4 could also be connected to the second pressing tool 3. A cavity 5 for a working medium, for example oil, is formed between the membrane 4 and the first pressing tool 2. The membrane 4 is manufactured from metal and preferably has a thickness in the range of between 0.2 mm and 3.5 mm. The cavity 5 can be filled with the working medium via a channel 6. Bores 7 are provided both in the upper pressing tool 2 and the lower pressing tool 3 through which a heating and/or cooling medium can be guided.

In the configuration of the device 1 shown in FIG. 1A, a working space 8 is formed between the first pressing tool 2 and the second pressing tool 3 into which a workpiece (not shown in FIG. 1A) can be inserted. In the present configuration, the working space 8 comprises in particular a recess 8a in the second pressing tool 3. The two pressing tools 2, 3 have a guide 9 which can for example be formed by a protrusion 9A and a recess 9B, wherein the protrusion 9A can be provided on the second pressing tool 3 and wherein the recess 9B can be provided on the first pressing tool 2.

The membrane 4 is connected to the first pressing tool 2 in the following manner: The first pressing tool 2 has a circumferential edge element 10, which is screwed to the first pressing tool 2 (the screw connection is not represented in FIG. 1A). A gap 11, through which the membrane 4 is guided, is formed between the first pressing tool 2 and its edge element 10. The gap 11 opens into a hollow space 12 in which a clamping device 13 is provided in which the membrane 4 is clamped. The clamping device 13 is connected to a tension anchor 14, which is led out of the first pressing tool 2 and the edge element 10 through an opening and is pressed outwards there by a spring 15 supporting itself on the outer surface, whereby the membrane 4 can be provided with a pretension, in particular a pretension force $F_V$. In order to seal the cavity 5, a seal 16 is provided in the gap 11, which allows a movement of the membrane 4. The membrane 4 can thus be passed by the seal 16. A device 17 for changing the sealing force is provided adjoining the seal 16. A device for changing the pretension 18 is also provided adjoining the spring 15.

Figure 1B:
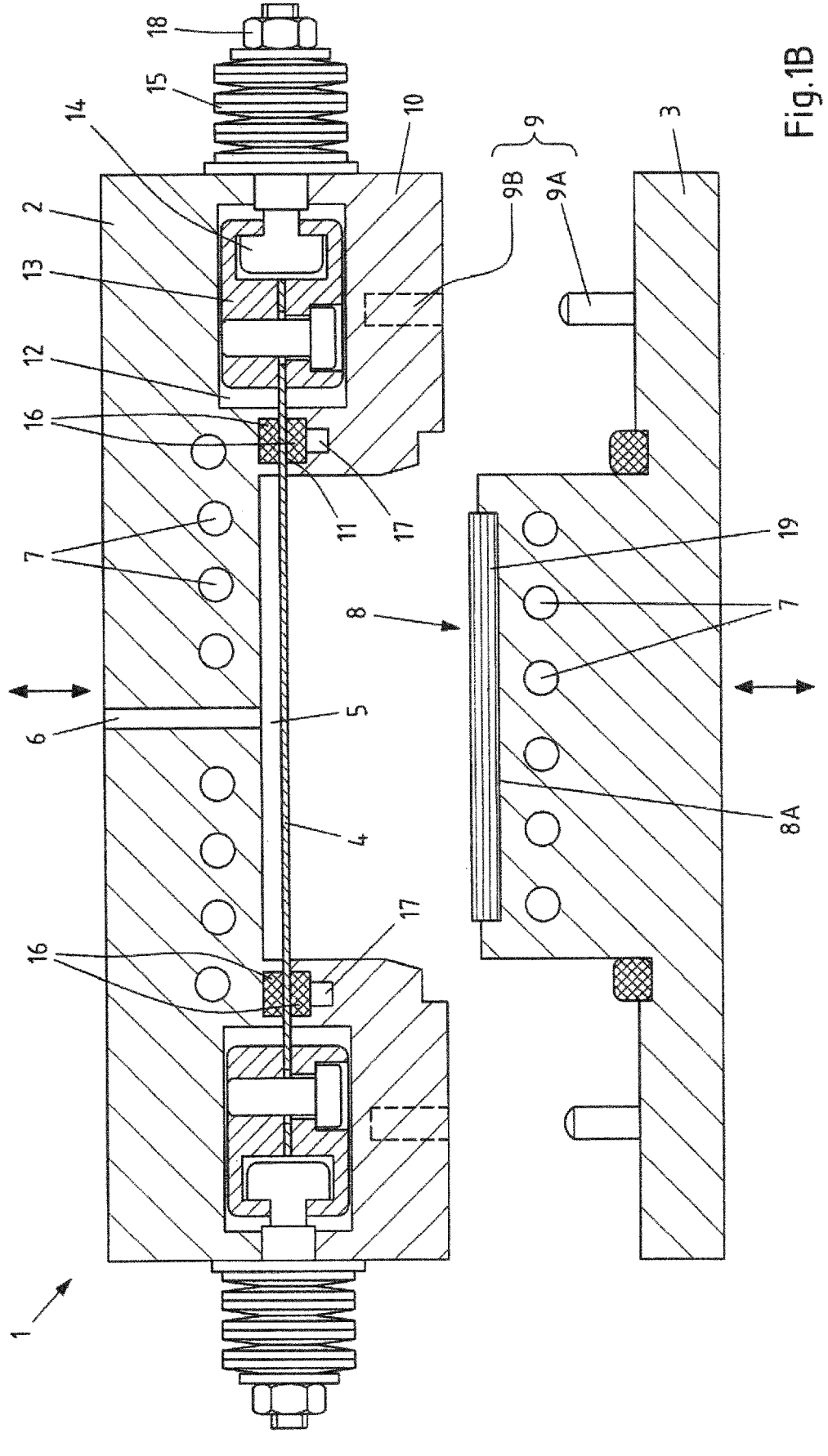
FIG. 1B: the device from FIG. 1A in an open position with an inserted workpiece.

FIG. 1B shows the device 1 from FIG. 1A in an open position with an inserted workpiece 19. The regions of the device 1, which have already been described, are provided in FIG. 1B with corresponding reference numerals. The difference with the position shown in FIG. 1A is that the workpiece 19 has been inserted into the working space 8, in particular the recess 8A of the second pressing tool 3.

Figure 1C:
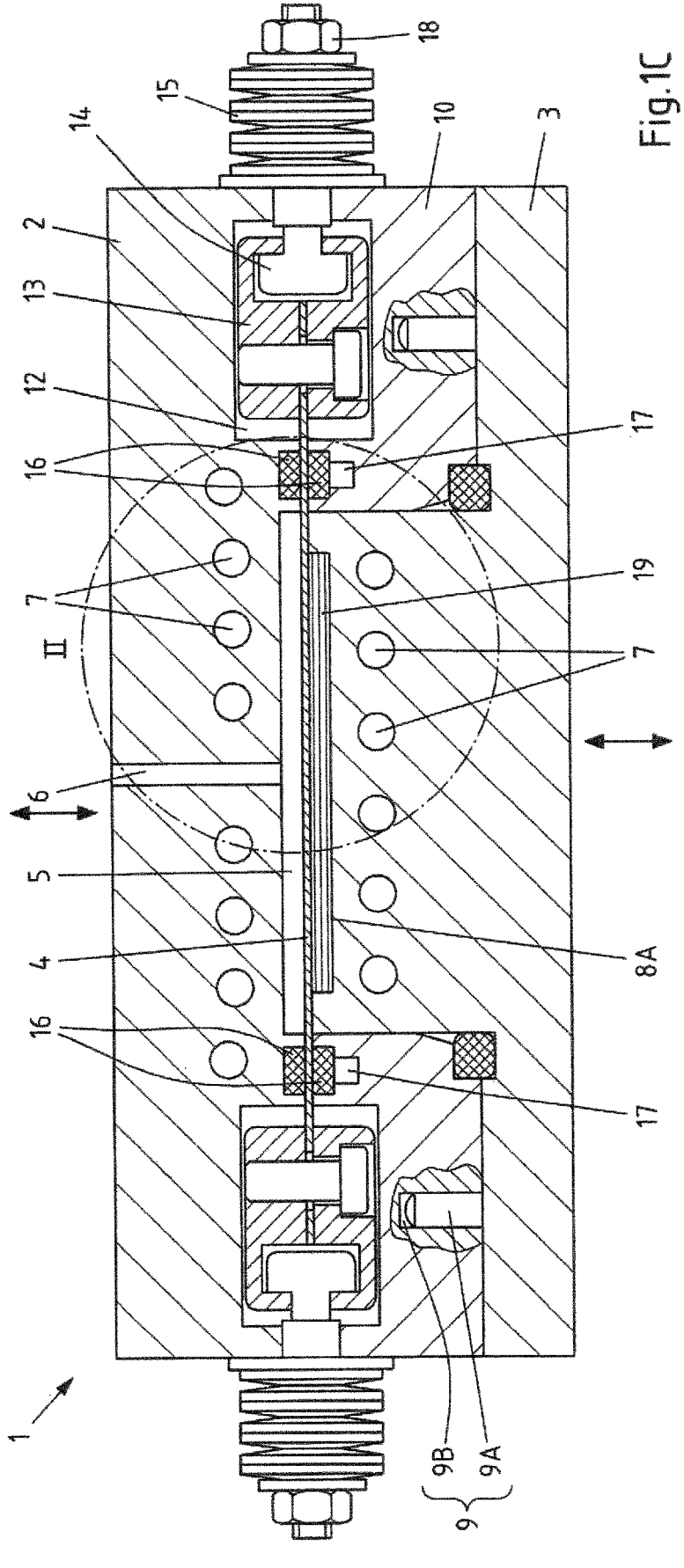
FIG. 1C: the device from FIG. 1A in a closed position with an inserted workpiece.

FIG. 1C shows the device 1 from FIG. 1A in a closed position. The regions of the device 1, which have already been described, are also provided in FIG. 1C with corresponding reference numerals. The device 1 has been closed by moving the two pressing tools 2, 3 towards one another into the closed position. In the position shown in FIG. 1C, pressure and/or temperature are applied to the workpiece 19. Pressure is applied by a working medium, for example oil, being guided through the channel 6 into the cavity 5, whereby the membrane 4 is pressed in the direction of the workpiece 19. Temperature can be applied in different ways: One possibility is to heat the working medium guided through the channel 6 into the cavity 5 such that the heat is transferred from the working medium located in the cavity 5 through the membrane 4 to the workpiece 19. Conversely, the working medium could be cooled in order to cool the workpiece 19. Alternatively or additionally to this, it can be provided that the bores 7 are flowed through by a heating and/or cooling medium, whereby first the two pressing tools 2, 3 and then also the membrane 4 and the workpiece 19 can be heated or cooled. Pressure and/or temperature can be applied to the membrane 4, the first pressing tool 2 and/or the second pressing tool 3 in the same way. As a result of the pressure action, the workpiece 19 is compressed in the position shown in FIG. 1C.

Figure 2:
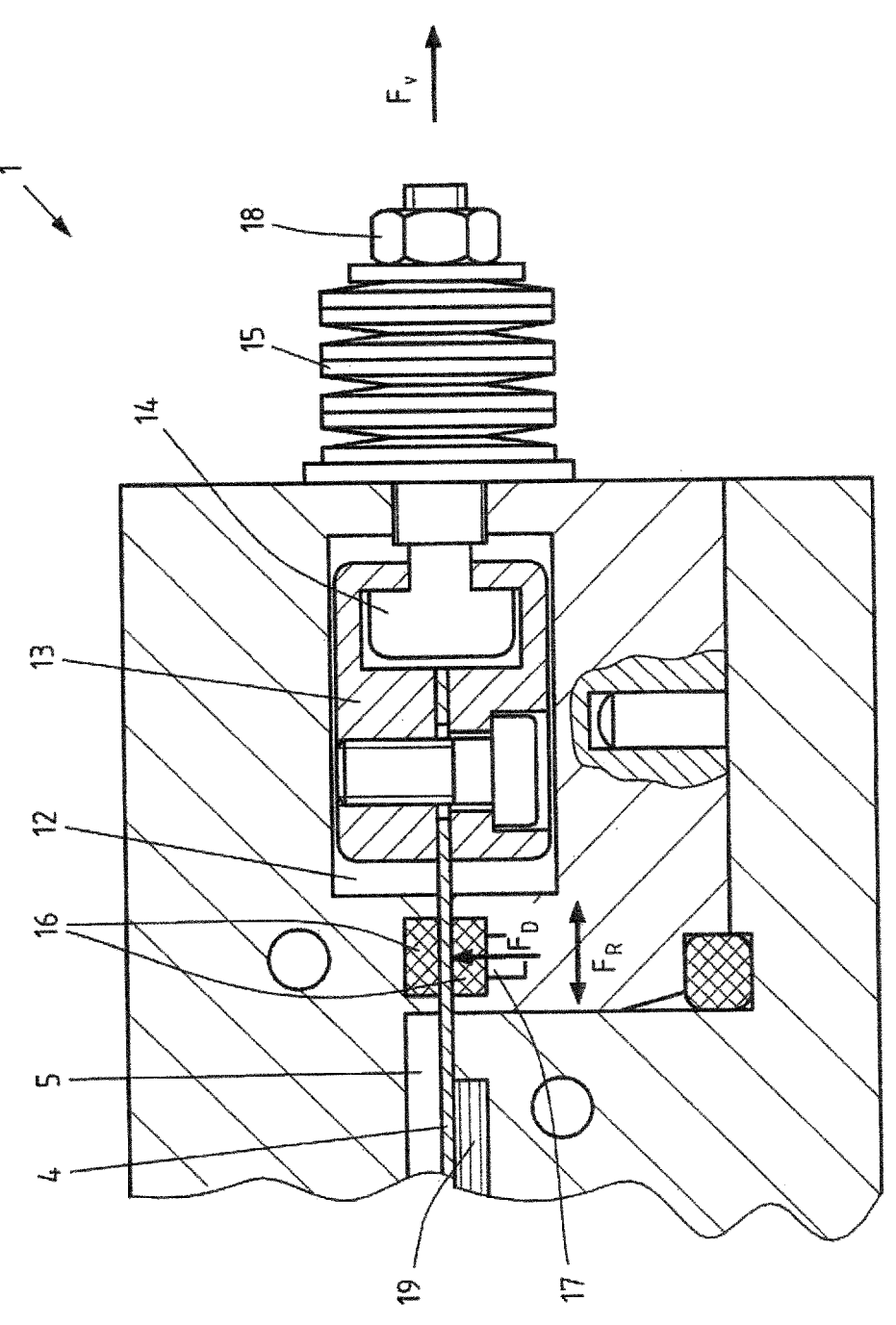
FIG. 2: a partial region of the device from FIG. 1C in enlarged view.

FIG. 2 shows a partial region of the device 1 from FIG. 1C in enlarged view. The regions of the device 1, which have already been described, are also shown in FIG. 2 with corresponding reference numerals. In FIG. 2A, the clamping and sealing of the membrane 4 are particularly easy to see. The cavity 5 is sealed at least in sections by the seal 16 applying a sealing force $F_D$ to the membrane 4, preferably by the seal 16 pressing on the membrane 4 with the sealing force F D. The sealing force $F_D$ acts perpendicularly on the surface of the membrane 4, i.e. in FIG. 2A approximately in the vertical direction. The size of the sealing force $F_D$ can be changed by the device 17 for changing the sealing force. This can for example take place in that the device 17 for changing the sealing force has an actuator which presses the seal 16 onto the membrane 4 with greater or smaller force. A greater sealing force $F_D$ results in a more reliable seal, but restricts the mobility of the membrane 4. Conversely, a smaller sealing force $F_D$ improves the mobility of the membrane 4, but leads to a worse seal and the associated risk of leaks. The size of the sealing force $F_D$ can therefore be set depending on the process parameters (in particular pressure and/or temperature in the cavity 5) to an optimum value by the device 17 for changing the sealing force.

The sealing force $F_D$ represented in FIG. 2 leads to a frictional force $F_R$ between the membrane and the seal. The frictional force $F_R$ acts along the membrane surface and thus parallel to the surface of the membrane 4, i.e. in FIG. 2 approximately in the horizontal direction. The frictional force $F_R$ is always directed against the movement of the membrane 4; since the membrane 4 can expand and contract, in particular thermally induced, the frictional force $F_R$ can therefore have different directions (represented by a double arrow in FIG. 2). For example, in the case of an expansion of the membrane 4 in the working space 8, the frictional force $F_R$ counteracts a movement of the membrane 4 out of the working space 8. In the case of a contraction of the membrane 4 in the working space 8, the frictional force $F_R$ counteracts a movement of the membrane 4 into the working space 8. The size of the frictional force $F_R$ depends on the size of the sealing force $F_D$ causing it, often, within certain limits, there is an approximately linear relationship (the ratio between frictional force and contact pressure is also referred to as the "friction coefficient").

In addition, a pretension force $F_V$ is represented in FIG. 2 with which the membrane 4 is pretensioned. The pretension force $F_V$ acts along the membrane surface and thus parallel to the surface of the membrane 4, i.e. in FIG. 2 approximately in the horizontal direction. The size of the pretension force $F_V$ can also be set or changed, namely by way of the device for changing the pretension 18. The setting or changing of the pretension force $F_V$ can for example be achieved by a change in the pretension of the spring 15.

Figure 3:
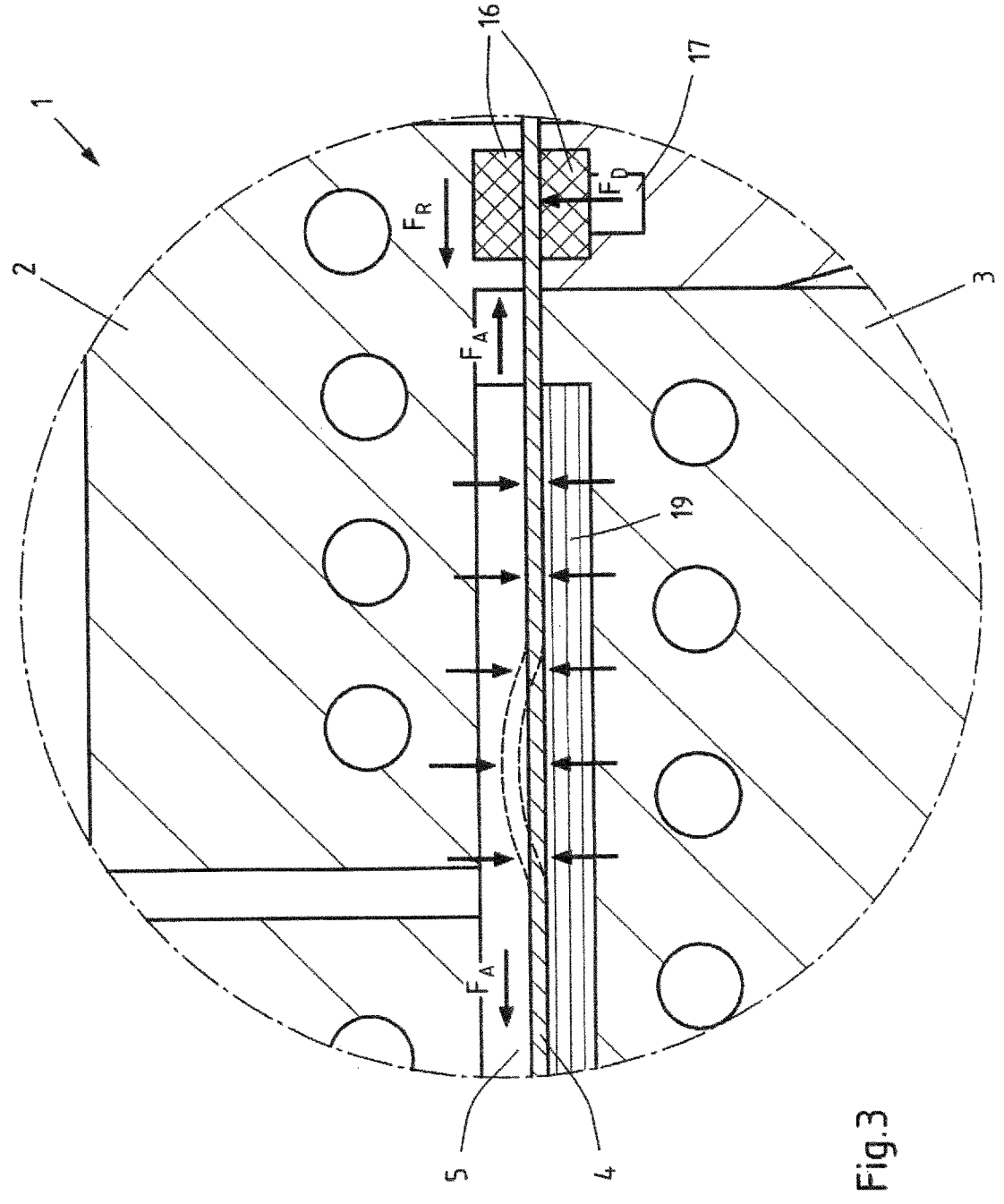
FIG. 3: a section of the device from FIG. 1C in enlarged view.

FIG. 3 shows a section of the device 1 from FIG. 1C in enlarged view. The two pressing tools 2, 3 are located in the closed position. Pressure and/or temperature are applied to the membrane 4 such that pressure and/or temperature can also be applied to the workpiece 19 by means of the membrane. In order to achieve a uniform application of pressure and/or temperature to the workpiece 19, the membrane 4 should bear substantially continuously against the workpiece 4. However, due to the application of pressure and/or temperature to the membrane 4, there may be an expansion of the membrane 4, in particular thermally induced. The two pressing tools 2, 3 can also expand due to the application of pressure and/or temperature, in particular thermally induced. The expansion of the membrane 4 is usually greater than the expansion of the pressing tools 2, 3. This is due to the fact that the membrane 4 is usually manufactured from a material which has a lower thermal expansion coefficient than the material or materials from which the pressing tools 2, 3 are manufactured. The pressing tools 2, 3 are, for example, manufactured from invar. Due to the expansion of the membrane 4, the membrane surface of the membrane 4 is enlarged and/or the membrane 4 is elongated, whereby there is the danger that the expanding membrane 4 expands into the cavity 5, in particular bulges into the cavity 5. An expansion of the membrane 4 into the cavity 5 is represented in FIG. 3 using dashed lines as an example. An expansion of the membrane 4 into the cavity 5 would have the consequence that the membrane 4 detaches from the workpiece 19, thus no longer bears substantially continuously against the workpiece 19 and pressure and/or temperature cannot be uniformly applied to the workpiece 19 by means of the membrane 4. In order to counteract an expansion of the membrane 4 into the cavity 5, pressure is therefore applied to the membrane 4, in particular by means of the working medium in the cavity 5. This application of pressure can in particular be the previously explained application of pressure and/or temperature to the membrane 4, in particular by means of the working medium in the cavity 5. The pressure applied to the membrane 4 must thereby be at least equal, preferably greater than the pressure with which the membrane 4 expands in the direction of the cavity 5.

An expansion force $F_A$ is effected along the membrane surface of the membrane 4 by the application of pressure to the membrane 4. The expansion force $F_A$ is thereby preferably effected in that the pressure applied to the membrane 4 is at least partially dissipated along the membrane surface of the membrane 4. By applying pressure to the membrane 4, the membrane 4 is also pressed at least in sections against the workpiece 19 to be machined or manufactured. As a result, the membrane is "clamped" at least in sections between the workpiece 19 and the pressure applied to the membrane 4 (represented by arrows in FIG. 3). Due to this clamping, the membrane 4 can only expand substantially along the membrane surface of the membrane 4, which also contributes to effecting the expansion force $F_A$ along the membrane surface of the membrane 4.

In order that the expanding or expanded membrane 4 does not detach from the workpiece 19, but rather bears substantially continuously against the workpiece 19, the surface or the section by which the membrane surface of the membrane 4 has enlarged and/or the membrane 4 has elongated must also be guided out of the working space 8. Otherwise, the membrane could unfold adjoining the pressing tools 2, 3, in particular adjoining the gap 11. In order to lead the membrane 4 out of the working space 8 at least in sections, the membrane 4 must be passed by the seal 16. Passing the membrane 4 by the seal 16 is thereby effected by the expansion force F A, which acts along the membrane surface of the membrane 4. However, the frictional force $F_R$ counteracts the passage of the membrane 4 by the seal 16 and is applied between the membrane 4 and the seal 16 due to the sealing force F D. The expansion force $F_A$ therefore counteracts the frictional force $F_R$ at least adjoining the seal 16. In order for the membrane 4 to pass by the seal 16, the sum of the forces acting along the membrane surface of the membrane 4, which counteract the frictional force $F_R$ between the membrane 4 and the seal 16 and act adjoining the seal 16, must preferably be greater than the frictional force $F_R$ between the membrane 4 and the seal 16. The sum of the forces acting along the membrane surface of the membrane 4, which counteract the frictional force $F_R$ between membrane 4 and seal 16 and act adjoining the seal 16, thereby comprises at least the expansion force $F_A$ adjoining the seal 16. Preferably, the expansion force $F_A$ is greater than the frictional force $F_R$, then no additional forces are necessary to pass the membrane 4 by the seal 16. In addition, however, the pretension force $F_V$, which can be applied to the membrane 4 by means of the device for changing the pretension, can also help to pass the membrane 4 by the seal 16. The sum of the expansion force $F_A$ adjoining the seal 16 and the pretension force F v, which acts in the same direction as the expansion force F A, must in this case be greater than the frictional force $F_R$ between the membrane 4 and the seal 16, which acts against the expansion force F A. In order to simplify the passage of the membrane 4 by the seal 16, it can therefore be provided that the sealing force $F_D$ is reduced by the device 17 for changing the sealing force during the application of pressure and/or temperature to the membrane.

After pressure and/or temperature has been sufficiently applied to the workpiece 19, the two pressing tools 2, 3 can be moved back into the open position, as shown in FIGS. 1A and 1B. The workpiece can then be removed from the device 1.

Figure 4A:
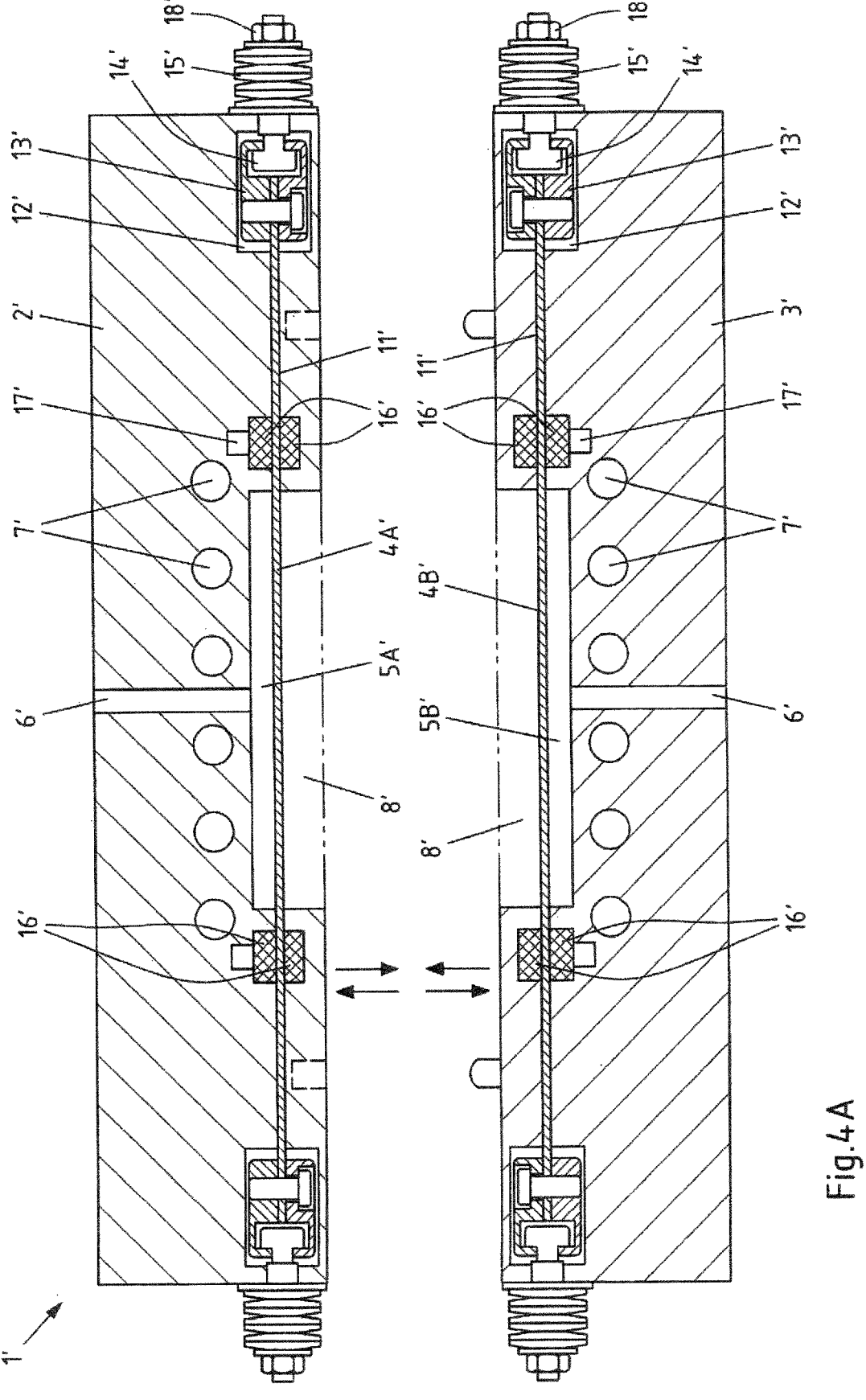
FIG. 4A: a second configuration of a device for carrying out a method according to the invention in cross-section in the open position without an inserted workpiece.

FIG. 4A shows a second configuration of a device 1' for carrying out a method according to the invention in cross-section in an open position without an inserted workpiece. The device 1' differs from the device 1 from FIG. 1A to FIG. 3 substantially in that the device 1' comprises a second membrane 4B'. However, the functioning of the two devices 1, 1' is basically the same. In the present case, therefore, detail will in particular be given on the differences between the two devices 1, 1'.

The device 1' shown in FIG. 4A comprises a first, upper pressing tool 2' and a second, lower pressing tool 3'. The two pressing tools 2', 3' can be moved relative to one another between an open position and a closed position, for example in a vertical direction (indicated by arrows in FIG. 4A). In addition, the device 1' comprises a first, upper membrane 4A' and a second, lower membrane 4B', wherein the first membrane 4A' is connected to the first pressing tool 2' and wherein the second membrane 4B' is connected to the second pressing tool 3'. A first cavity 5A' for a working medium is formed between the first membrane 4A' and the first pressing tool 2' connected thereto and a second cavity 5B' for a working medium is formed between the second membrane 4B' and the second pressing tool 3' connected thereto, wherein the working medium can for example be oil. The membrane 4A', 4B' is manufactured from metal and preferably has a thickness in the range of between 0.2 mm and 3.5 mm. The cavities 5A', 5B' can each be filled with the working medium via a channel 6'. Bores 7' are provided both in the first pressing tool 2' and the second pressing tool 3' through which a heating and/or cooling medium can be guided.

The device 1 shown in FIG. 4A also has a working space 8' in which a workpiece (not shown in FIG. 4A) can be inserted. The working space 8' extends partially into the first pressing tool 2' and partially into the second pressing tool 3'. The two pressing tools 2', 3' have a guide 9' which can for example be formed by a protrusion 9A' and a recess 9B', wherein the protrusion 9A' can be provided on the second pressing tool 3' and wherein the recess 9B' can be provided on the first pressing tool 2'.

The first membrane 4A' is connected to the first pressing tool 2' in the following manner (the same applies to the second membrane 4B' and the second pressing tool 3'): the first pressing tool 2' has a gap 11' in its edge region through which the first membrane 4A' is guided. The gap 11' opens into a hollow space 12' in which a clamping device 13' is provided into which the first membrane 4A' is clamped. The clamping device 13' is connected to a tension anchor 14', which is led out of the first pressing tool 2' through an opening and is pressed outwards there by a spring 15' supporting itself on the outer surface, whereby the first membrane 4A' can be provided with pretension, in particular pretension force $F_V$. Adjoining the spring 15', a device for changing the pretension 18' is also provided by means of which the pretension, in particular the pretension force F v, can be changed. In order to seal the first cavity 5A', a seal 16' is provided in the gap 11', which allows a movement of the first membrane 4A'. Adjoining the seal 16', a device 17' for changing the sealing force is also provided.

Figure 4B:
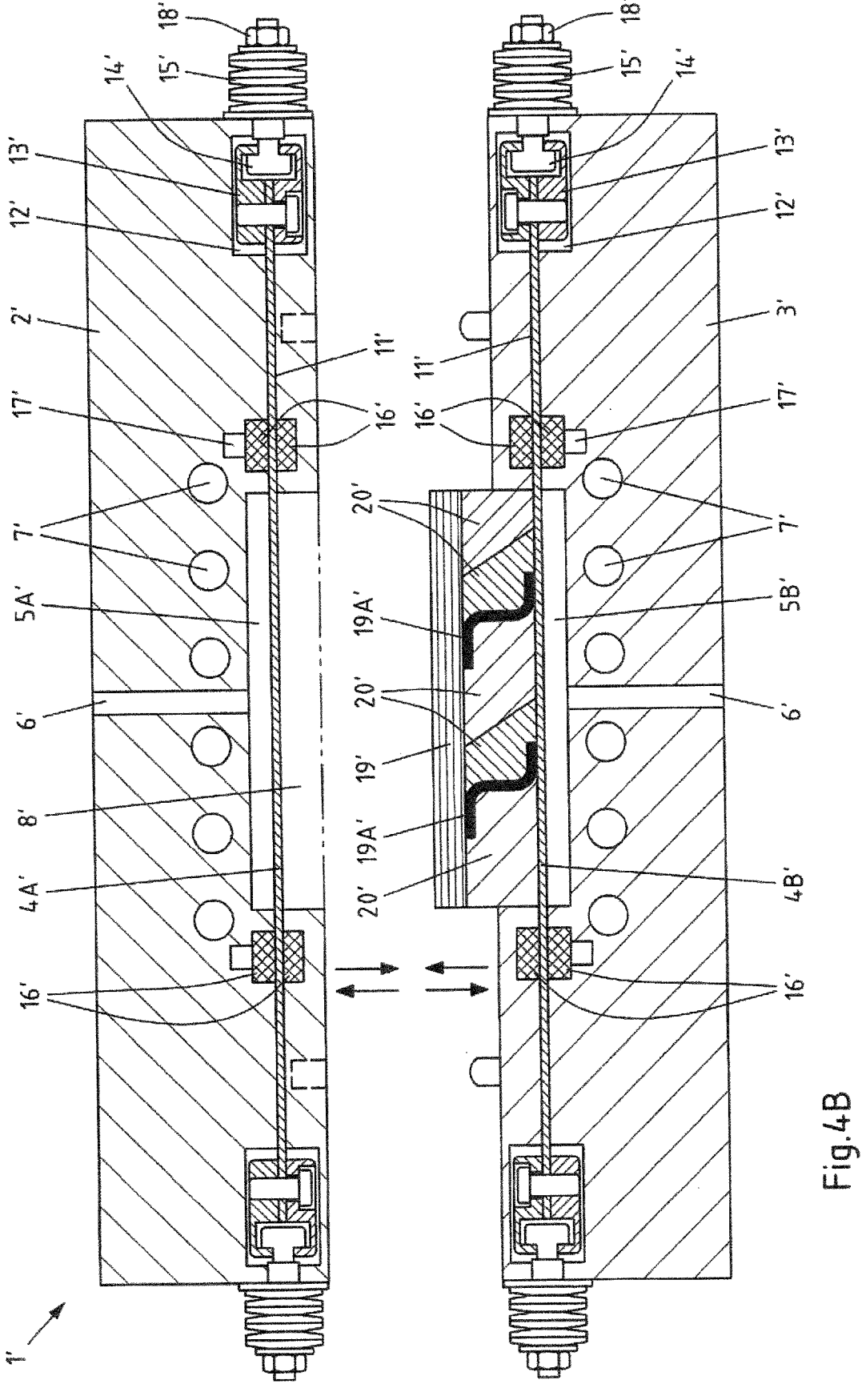
FIG. 4B: the device from FIG. 4A in an open position with an inserted workpiece.

FIG. 4B shows the device 1' from FIG. 4A in an open position with an inserted workpiece 19'. The regions of the device 1', which have already been described, are provided in FIG. 4B with corresponding reference numerals. The difference with the position shown in FIG. 4A is that the workpiece 19' has been inserted into the working space 8' of the second pressing tool 3'. In addition to the workpiece 19', two further workpieces 19A' are inserted into the working space 8' of the device 1, wherein the workpieces 19A' can for example be already prefabricated reinforcement elements with Z-shaped cross-section (e.g. "stringers" of an aircraft fuselage). The workpieces 19A' should be connected to the workpiece 19' in the subsequent production step. In order to enable a uniform pressure distribution despite the complex geometry of the workpieces 19A', a plurality of cores 20' are inserted into the working space, the shape of which is adapted to the shape of the working space 8' and to the shape of the workpieces 19', 19A'.

Figure 4C:
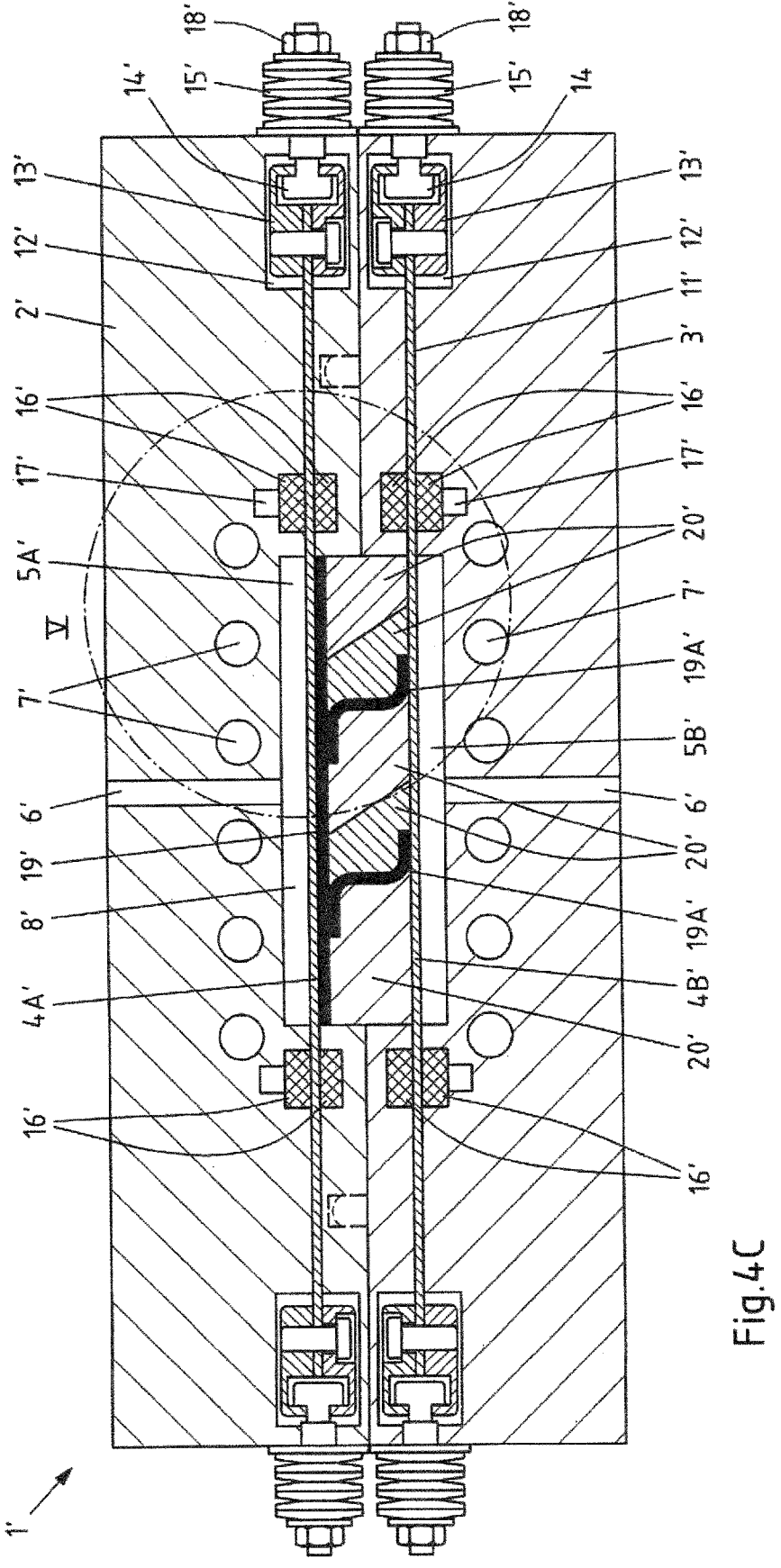
FIG. 4C: the device from FIG. 4A in a closed position with an inserted workpiece.

FIG. 4C shows the device 1' from FIG. 4A in a closed position. The regions of the device 1', which have already been described, are also provided in FIG. 4C with corresponding reference numerals. The device 1' has been closed by moving the two pressing tools 2', 3' towards one another into the closed position. In the closed position shown in FIG. 4C, pressure and/or temperature are applied to the workpiece 19'. The application of pressure and/or temperature takes place according to the approach described in connection with the first configuration of a device 1 for carrying out the method. In the present second embodiment, the two cavities 5A', 5B' can be filled with working medium independently of one another, however, the two cavities 5A', 5B' are preferably filled uniformly with working medium. Pressure and/or temperature can also be applied to the working medium in the two cavities 5A', 5B' and/or the two membranes 4A', 4B' independently of one another. Alternatively or additionally, pressure and/or temperature is uniformly applied to the working medium in the two cavities 5A', 5B' and/or the two membranes 4A', 4B'.

Figure 5:
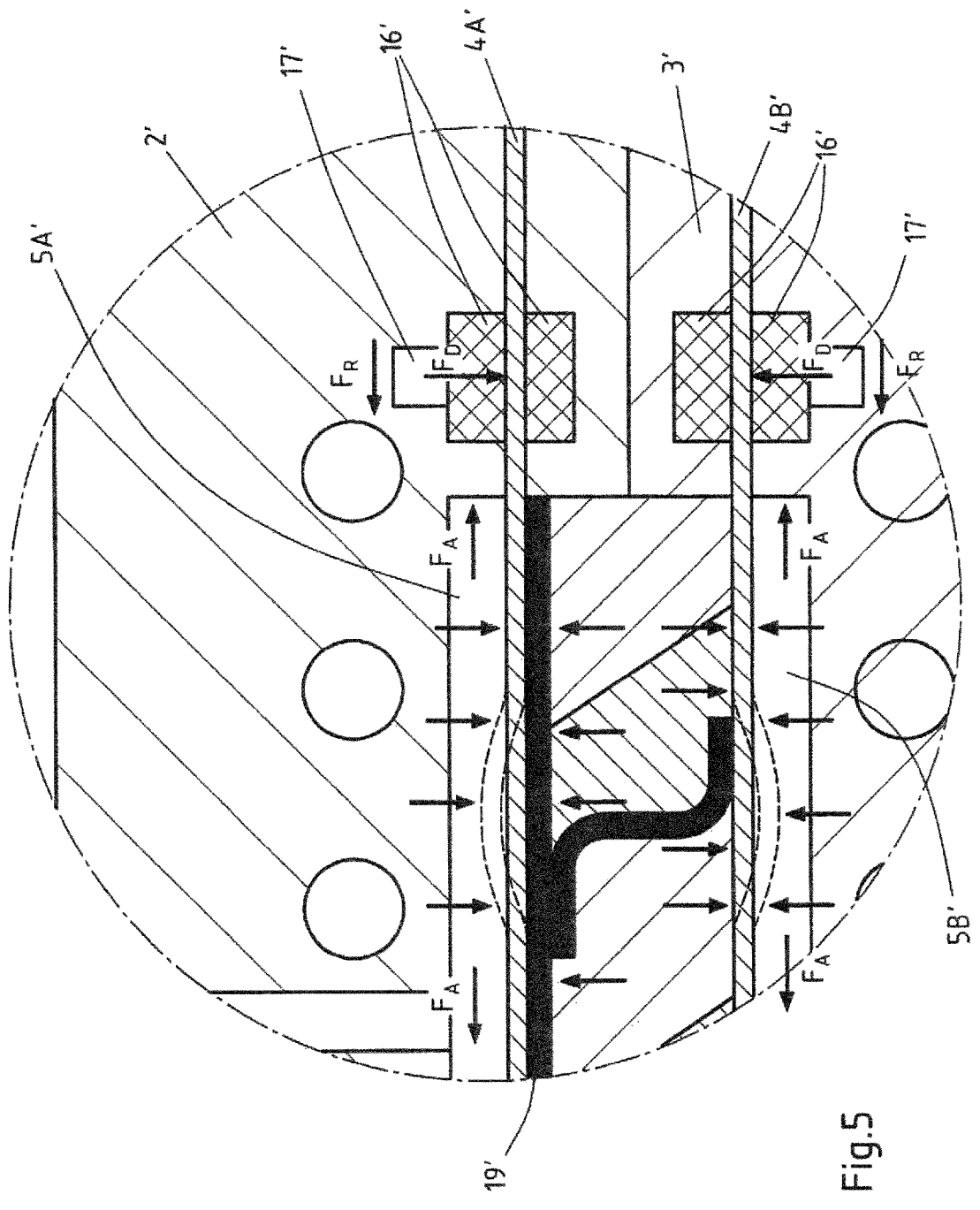
FIG. 5: a section of the device from FIG. 4C in enlarged view.

FIG. 5 shows a section of the device 1' from FIG. 4C in enlarged view. The two pressing tools 2', 3' are located in the closed position. Pressure and/or temperature are applied to the two membranes 4A', 4B' so that pressure and/or temperature can also be applied to the workpiece 19' by means of the membranes 4A', 4B'. The cavities 5A', 5B' are also sealed at least in sections by the seals 16' applying a sealing force $F_D$ to the respective membrane 4A', 4B', preferably by the respective seal 16' pressing on the respective membrane 4A', 4B' with a sealing force $F_D$. The sealing force $F_D$ acts perpendicularly on the surface of the respective membrane 4A', 4B', i.e. in FIG. 5 approximately in the vertical direction. The size of the sealing force $F_D$ can be changed by the respective device 17' for changing the sealing force, wherein each device 17' for changing the sealing force can independently change the respective sealing force $F_D$.

However, the devices 17' for changing the sealing force preferably uniformly change the respective sealing force $F_D$. As already explained for the first configuration of the device 1 for carrying out the method, the respective sealing forces $F_D$ lead to a respective frictional force $F_R$ between the respective membrane 4A', 4B' and the respective seal 16'. The frictional force $F_R$ thereby acts along the membrane surface of the respective membrane 4A', 4B' and thus parallel to the surface of the respective membrane 4A', 4B'.

The problem also arises in this second configuration of the device 1' that due to the application of pressure and/or temperature to the membranes 4A', 4B', this can lead to, in particular thermal expansion of the membranes 4A', 4B'. The two pressing tools 2', 3' can also expand through the application of pressure and/or temperature, in particular thermally, wherein the expansion of the membranes 4A', 4B' is usually stronger than the expansion of the pressing tools 2", 3'. As already explained for the first configuration of the device 1, the respective membrane surfaces of the membranes 4A', 4B' are enlarged and/or the membrane 4A', 4B' are elongated, whereby there is a danger that the expanding membranes 4A', 4B' expand into the respective adjoining cavity 5A', 5B'. An expansion of the membranes 4A', 4B' into the respective cavity 5A', 5B' is represented in FIG. 5 using dashed lines as an example. In order to counteract an expansion of the membranes 4A', 4B' into the respective cavity 5A', 5B', in this configuration of the device 1', pressure is also applied to the membranes 4A', 4B, in particular by means of the working medium in the respective cavities 5A', 5B'. This application of pressure can in particular be the previously explained application of pressure and/or temperature to the membranes 4A', 4B', in particular by means of the working medium in the respective cavities 5A', 5B'. The pressure applied to the membranes 4A', 4B' must thereby in each case be at least equal, preferably greater than the pressure with which the respective membrane 4A', 4B' expands in the direction of the respective adjoining cavity 5A', 5B'. Pressure can thereby in each case be applied to the membranes 4A', 4B' independently of one another or uniformly. The application of pressure to the membranes 4A', 4B' effects a respective expansion force $F_A$ along the membrane surface of the respective membrane 4A', 4B'.

As already explained for the first configuration of the device 1, the respective membrane 4A', 4B' can pass by the seal counter to the respective frictional force F R due to the expansion force F A. The sum of the forces acting along the membrane surface of the respective membrane 4A', 4B', which counteract the respective frictional force $F_R$ between the respective membrane 4A', 4B' and the respective seal 16' and act adjoining the respective seal 16', must preferably be greater than the respective frictional force $F_R$ between the respective membrane 4A', 4B' and the respective seal 16'. In the present case, it can be provided that this sum of the forces per membrane 4A', 4B' can be different or equal in size. In addition, the expansion force $F_A$ adjoining the respective seal per membrane 4A', 4B' can be different or equal in size. The pretension force $F_V$, which can be applied to the respective membrane 4A', 4B' by means of the respective devices for changing the pretension 18' and which acts in the same direction as the respective expansion force $F_A$, per membrane 4A', 4B', can also be different or equal in size. The sum of the expansion force $F_A$ adjoining the seal 16 and the pretension force $F_V$, which acts in the same direction as the expansion force $F_A$, can also be different or equal in size per membrane 4A', 4B'. Similarly, the change in the sealing force $F_D$ can take place independently of one another or uniformly by the devices 17 for changing the sealing force per membrane 4A', 4B'.

LIST OF REFERENCE NUMERALS 1, 1': Device
2, 2': First (upper) pressing tool
3, 3': Second (lower) pressing tool
4, 4A', 4B': Membrane
5, 5A', 5B': Cavity
6, 6': Channel
7, 7': Bore
8, 8': Working space
8A: Recess
9, 9': Guide
9A, 9A' Protrusion
9B, 9B' Recess
10: Edge element
11, 11': Gap
12, 12': Hollow space
13, 13': Clamping device
14, 14': Tension anchor
15, 15': Spring
16, 16': Seal
17, 17': Device for changing the sealing force
18, 18': Device for changing the pretension
19, 19', 19A': Workpiece
20': Core
$F_A$: Expansion force
$F_D$: Sealing force
$F_R$: Frictional force
$F_V$: Pretension force

The invention claimed is:

1. A method for manufacturing moulded parts, in comprising the following steps:

a) providing a device comprising:

a first pressing tool, a second pressing tool, at least one membrane, and at least one seal, wherein the first pressing tool and the second pressing tool can be moved relative to one another between an open position and a closed position, wherein a working space for a workpiece is formed between the first pressing tool and the second pressing tool, wherein the membrane is arranged at least in sections between the first pressing tool and the second pressing tool, wherein the membrane is arranged at least in sections in the working space, wherein at least one cavity for a working medium is formed between the membrane and the first pressing tool and/or the second pressing tool at least in the closed position, wherein the cavity can be sealed by the seal at least in sections at least in the closed position, wherein, in order to seal the cavity, a sealing force ($F_D$) can be applied to the membrane by means of the seal, and wherein the membrane and the first pressing tool and/or the second pressing tool have different thermal expansion coefficients, b) applying a sealing force ($F_D$) by means of the seal to the membrane, wherein the cavity is sealed at least in sections by applying the sealing force ($F_D$) to the membrane, and wherein a frictional force; ($F_R$) is applied between the membrane and the seal by the sealing force ($F_D$), c) applying pressure and/or temperature to the membrane, wherein the membrane extends at least in sections at least in the working space, wherein pressure is applied to the membrane, wherein the pressure counteracts an expansion of the membrane into the cavity and thereby effects an expansion force ($F_A$) along the membrane surface, and wherein the expansion force ($F_A$) counteracts the frictional force ($F_R$) between the membrane and the seal at least adjoining the seal, wherein the membrane can be passed by the seal and in that in step c), the membrane is passed by the seal at least in sections due to the expansion force ($F_A$).

2. The method for manufacturing moulded parts according to claim 1, wherein step b) and step c) overlap at least in time.

3. The method for manufacturing moulded parts according to claim 1, wherein the expansion force ($F_A$) is greater than the frictional force ($F_R$) between the membrane and the seal.

4. The method for manufacturing moulded parts according to claim 1, comprising the following steps, which takes place after step a):

a1) providing at least one workpiece, a2) inserting the workpiece into the device, and a3) moving the first pressing tool and/or the second pressing tool into the closed position.

5. The method for manufacturing moulded parts according to claim 1, wherein the device provided in step a) comprises at least one device for changing the pretension of the membrane.

6. The method for manufacturing moulded parts according to claim 5, comprising the following step, which takes place after step a):

a4) pretensioning the membrane by means of the device for changing the pretension.

7. The method for manufacturing moulded parts according to claim 6, wherein a pretension force (Fv) is applied to the membrane through the pretensioning of the membrane according to step a4).

8. The method for manufacturing moulded parts according to claim 7, wherein during step b) and/or during step c), the pretension force (Fv) applied to the membrane is changed, by the device for changing the pretension.

9. The method for manufacturing moulded parts according to claim 7, wherein the sum of expansion force ($F_A$) and pretension force (Fv) is greater than the frictional force ($F_R$) between the membrane and the seal.

10. The method for manufacturing moulded parts according to claim 1, wherein during step b) and/or during step c), the pressure and/or the temperature of the working medium in the cavity are changed.

11. The method for manufacturing moulded parts according to claim 1, wherein the device provided in step a) comprises at least one device for changing the sealing force.

12. The method for manufacturing moulded parts according to claim 1, wherein the device provided in step a) comprises at least one second membrane, wherein at least one second cavity for a working medium is formed between the at least second membrane and the first pressing tool and/or the second pressing tool at least in the closed position, wherein, in order to seal the second cavity, a sealing force can be applied to the second membrane by means of at least one second seal, and wherein the second membrane can be passed by the second seal.

13. The method for manufacturing moulded parts according to claim 1, wherein in step b) and/or in step c), the pressure of the working medium located in the cavity is raised at least to 1.2 bar.

14. The method for manufacturing moulded parts according to claim 1, wherein in step b) and/or in step c), the temperature of the working medium located in the cavity is raised to a maximum temperature in the range of between 280° C. and 500° C.

15. The method for manufacturing moulded parts according to claim 1, comprising the following step, which takes place after step b) and/or after step c):

c) opening the device and removing the workpiece.

* * * * *